(12) United States Patent
Blumenfeld et al.

(10) Patent No.: US 9,313,177 B2
(45) Date of Patent: Apr. 12, 2016

(54) ANONYMOUS INFORMATION SHARING (71) Applicant: TruSTAR Technology, LLC, Baltimore, MD (US)

(72) Inventors: Ian T. Blumenfeld, Baltimore, MD (US); Rebecca A. Borbely, Baltimore, MD (US); Frederick W. Wolfinger, Jr., Ellicott City, MD (US); Mark V. Raugas, Baltimore, MD (US)

(73) Assignee: TruSTAR Technology, LLC, Baltimore, MD (US)

( * ) Notice: Subject to any disclaimer, the term of this patent is extended or adjusted under 35 U.S.C. 154(b) by 0 days.

(21) Appl. No.: 14/627,609

(22) Filed: Feb. 20, 2015

(65) Prior Publication Data
US 2015/0244681 A1 Aug. 27, 2015

Related U.S. Application Data (60) Provisional application No. 62/018,954, filed on Jun. 30, 2014, provisional application No. 61/943,053, filed on Feb. 21, 2014.

(51) Int. Cl.
*H04L 29/06* (2006.01)
*G06F 21/31* (2013.01)
*G06F 21/62* (2013.01)

(52) U.S. Cl.
CPC ............ *H04L 63/0421* (2013.01); *G06F 21/31* (2013.01); *G06F 21/6254* (2013.01); *H04L 63/08* (2013.01)

(58) Field of Classification Search
None
See application file for complete search history.

(56) References Cited

U.S. PATENT DOCUMENTS

| | | | | |
|---|---|---|---|---|
| 6,807,569 B1 * | 10/2004 | Bhimani | ............... | G06F 21/577 705/44 |
| 8,800,044 B2 | 8/2014 | Raad | | |
| 9,009,827 B1 * | 4/2015 | Albertson | ............... | H04L 63/14 726/22 |
| 2002/0038430 A1 * | 3/2002 | Edwards | ................. | H04L 29/06 726/26 |

* cited by examiner

*Primary Examiner* — Minh Dinh (57) ABSTRACT

An anonymous information sharing service is described herein. The anonymous information sharing service includes performing anonymous authentication of a user who would like to report an incident, anonymizing incident data, and sharing the incident data with multiple users of the anonymous information sharing service.

20 Claims, 6 Drawing Sheets

ANONYMOUS INFORMATION SHARING

CROSS REFERENCE TO RELATED APPLICATIONS

This application claims the benefit of U.S. provisional patent application No. 61/943,053, filed on Feb. 21, 2014, and U.S. provisional patent application No. 62/018,954, filed on Jun. 30, 2014, which are incorporated by reference herein.

FIELD

This disclosure generally relates to anonymous information sharing.

BACKGROUND

Several information sharing systems and services have been developed to combat cyberattacks. However, for a number of reasons, none of these efforts have developed into effective cyberattack collaboration systems. Some of the deficiencies in existing systems include: attribution risk associated with public and regulatory risks in sharing attack information; system limitations such as being limited to a single government or geographical location; a lack of trusted relationships for imparting true and open collaboration; and a lack of sophisticated analysis tools for filtering through reports and generating insightful and actionable intelligence that is relevant to a particular system member's sector or technologies. In addition, in many cases, the systems place a burden on the information provider to gather, format, and anonymize their inputs, and to make sense of an information feed.

SUMMARY

This disclosure describes anonymous information sharing that allows users to share cyber incident information through a secure platform that protects the users' identities. Users may also have the assurance that all reported information comes from other users of an anonymous information sharing service.

Innovative aspects of the subject matter described in this disclosure may, in some implementations, be embodied in a computer-implemented method that includes actions of receiving, at a server from a client device, a request for anonymous authentication, the client device being operated by an authorized user of an information sharing service; generating, at the server, a set of ciphers, wherein each cipher is based on a selected random value encrypted with one of a set of random tokens and one of a set of public keys of users of the information sharing service; transmitting, to the client device, the set of ciphers; receiving, from the client device, a decrypted value based on the set of ciphers; determining, at the server, that the decrypted value matches the selected random value; transmitting, to the client device, the set of random tokens such that the client device can determine that the server did not identify the authorized user; receiving, from the client device, an anonymized incident report; and correlating the anonymized incident report with open source information and one or more of another anonymized incident report to provide one or more reports to users of the information sharing service.

In some implementations, a non-transitory computer-readable storage medium is provided and includes instructions, which, when executed by one or more computers, cause the one or more computers to perform actions. The actions include receiving, at a server from a client device, a request for anonymous authentication, the client device being operated by an authorized user of an information sharing service; generating, at the server, a set of ciphers, wherein each cipher is based on a selected random value encrypted with one of a set of random tokens and one of a set of public keys of users of the information sharing service; transmitting, to the client device, the set of ciphers; receiving, from the client device, a decrypted value based on the set of ciphers; determining, at the server, that the decrypted value matches the selected random value; transmitting, to the client device, the set of random tokens such that the client device can determine that the server did not identify the authorized user; receiving, from the client device, an anonymized incident report; and correlating the anonymized incident report with open source information and one or more of another anonymized incident report to provide one or more reports to users of the information sharing service.

In some implementations, a system includes one or more computers and one or more storage devices storing instructions that are operable and when executed by the one or more computers, cause the one or more computers to perform actions. The actions include receiving, at a server from a client device, a request for anonymous authentication, the client device being operated by an authorized user of an information sharing service; generating, at the server, a set of ciphers, wherein each cipher is based on a selected random value encrypted with one of a set of random tokens and one of a set of public keys of users of the information sharing service; transmitting, to the client device, the set of ciphers; receiving, from the client device, a decrypted value based on the set of ciphers; determining, at the server, that the decrypted value matches the selected random value; transmitting, to the client device, the set of random tokens such that the client device can determine that the server did not identify the authorized user; receiving, from the client device, an anonymized incident report; and correlating the anonymized incident report with open source information and one or more of another anonymized incident report to provide one or more reports to users of the information sharing service.

Other implementations include corresponding systems, apparatuses, and computer programs, configured to perform the above-noted actions, encoded on computer storage devices.

These and other implementations may each optionally include one or more of the following features. For instance, the implementations further include actions of providing, to the client device, a template; detecting collaboration between users of the information sharing service after providing the one or more reports; updating a database of the information sharing service with the collaboration; and breaking a connection with the client device in response to the decrypted value not matching the selected random value. The received anonymized incident report is anonymized using the template. User attributable terms in the incident report are detected using the template. The detected user attributable terms are encrypted. The anonymized incident report includes information associated with one or more of a type of cyber-attack, a date and time of the cyber-attack, a solution or preventive measure for the cyber-attack, indicators of compromise, intelligence on an actor of the cyber-attack, and a target of the cyber-attack. Providing one or more reports to users of the information sharing service includes generating, by the server and based on the correlating, cyber-attack information indicating one or more of: warnings for a cyber-attack reported in the anonymized incident report, remediation guidance for the cyber-attack, directions on how to reduce user risk to the cyber-attack, information indicating likely targets or trends of the cyber-attack, entry points and technologies associated with the cyber-attack, and methods utilized by the cyber-attack; and transmitting, based on preferences of the users of the information sharing service, a first message including the cyber-attack information. Transmitting, based on preferences of the users of the information sharing service, a first message including the cyber-attack information includes transmitting the first message using one or more of electronic mail and short message service (SMS) messaging. The preferences of the users of the information sharing service include, for each respective user, indications of a type of content and message to be received by each user.

The details of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This disclosure describes an anonymous information sharing service for providing users with actionable cyber incident information so that users can proactively implement security measures for protection from cyber threats and can reduce the risk of harm. Users may share access to solutions as well as attack information to assist in defining effective strategies to prevent successful attacks.

The information sharing service anonymously collects cyber incident information submitted by users, and correlates the cyber incident information with open source information to provide reports with remediation guidance and directions on how to reduce risk. These reports may be tuned to focus on cyber activity within the users' business sectors, supply chain, regions, and technologies to provide data on current attack actors, trends, and attack vectors, thereby producing a predictive view of threats likely to harm a user in the future. In some cases, information sharing service may send these reports to a user's electronic mailbox (e.g., inbox) and the reports may be prioritized or displayed in the user's electronic mailbox based on user preferences. User preferences may include indications of the types of alerts and reports the user wants to receive or prioritize. A user may set the user preferences through filters in the user's electronic mailbox. In general, various suitable methods may be used to transmit and display reports according to user preferences.

Cyber incident information may include various types of information associated with a cyber-network, cyber-incident, or device, and may include cyber-threat intelligence. Cyber-threat intelligence on real-time attacks and trends within an industry sector or across sectors helps enterprise security staff and management assess their security posture, assess the effectiveness of their defenses and helps them efficiently direct budgets in a targeted manner. Knowledge of what is happening within a sector and across other sectors (including Cloud and Mobile sectors) may enable users to allocate limited resources with maximum effectiveness.

In general, the anonymous information sharing service, as described herein, includes a cyber-intelligence and collaboration system designed to help users quickly and/or preemptively defend against cyberattacks and threats. Through correlation of user-provided incident and attack reports, combined with open source information, the anonymous information sharing service may provide prioritized reporting on attack vectors and trends that are pertinent to a users' region, sector, supply chain, or network environment. Responsive and actionable incident information allows users to recognize and act against current attacks and to efficiently implement defensive actions and remediation against likely future attacks.

An advantage of the anonymous information sharing service, as described in this disclosure, is that users may receive protection through anonymity. Users share cyber incident information through a secure platform that protects their identity. Users also have the assurance of knowing that all report information comes from other subscribers/users of the anonymous information sharing service. The anonymous information sharing service may help users efficiently utilize their resources to get ahead of cyber adversaries, while remaining completely anonymous to public and regulatory entities.

In particular, implementations of the anonymous information sharing service provide users tailored anonymization tools that will accept a variety of input formats, and provide cryptographic anonymization of attributable data. A cryptographic key exchange system that can identify the user as an authorized user of the service, without revealing the user's identity, may be used. Transmitted reports are also scrubbed for any attributable data prior to storage in a database. A low resource impact method is utilized for users to provide their normal incident reporting data, while maintaining anonymity. According to some implementations, a source of any received data is not recorded.

The anonymous information sharing service, as described herein, may include execution of a variety of functions. For example, user information and open source information may be correlated and analyzed to derive adversary attack trends for industry sectors, targeted regions, and relevant technologies. The anonymous information sharing service may generate and provide: urgent alerts that include timely and actionable information about attacks that users may be experiencing or be susceptible to; and regular trend reports providing intelligence to use in long term and short term budget and remediation planning. The anonymous information sharing service may include member forums that provide an opportunity for users to discuss trends and specific issues, and define future strategies.

For the purposes of this disclosure, a "user" may refer to organizations and/or enterprises with a valid subscription to the anonymous information sharing service, employees of the organizations and/or enterprises, or devices of the employees, organizations, or enterprises.

Figure 1:
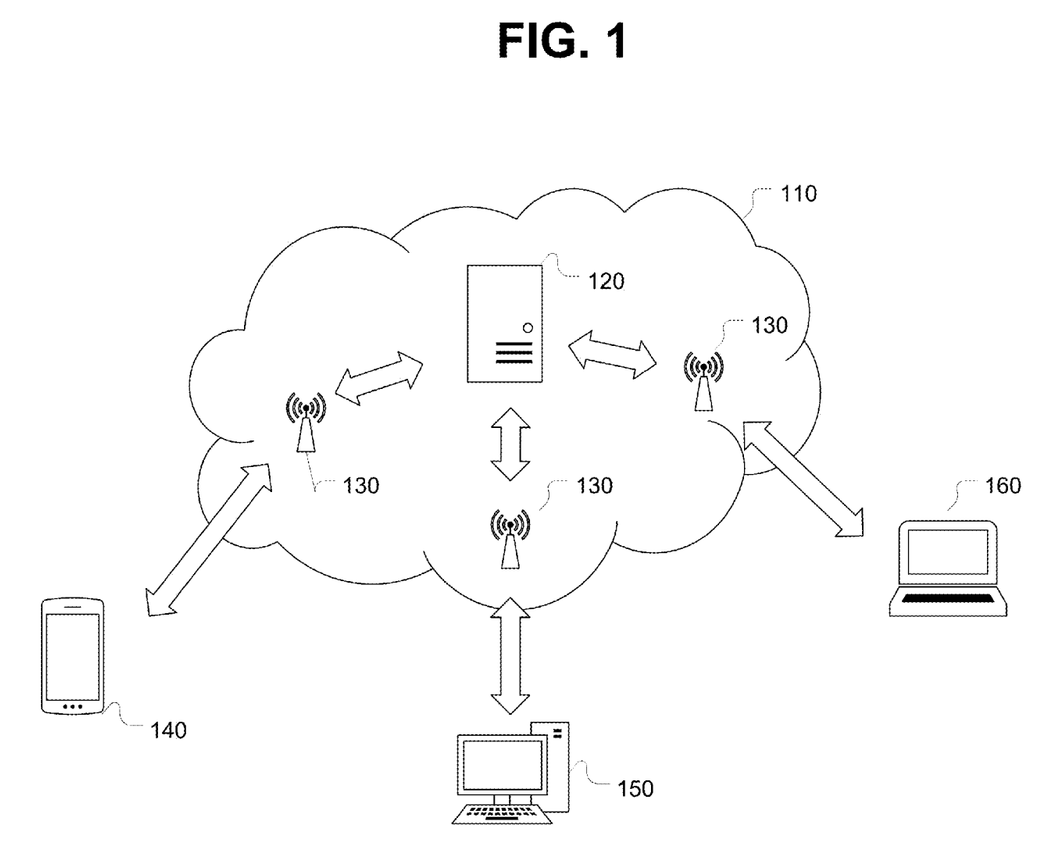
FIG. 1 is an illustration of an exemplary system implementing an anonymous information sharing service.

Referring to FIG. 1, an exemplary system implementing an anonymous information sharing service is illustrated. The system may include one or more network(s) 110, one or more server(s) 120, one or more access point(s) 130, and devices 140, 150, and 160.

The one or more network(s) 110 may provide network access, data transport, and other services to the server 120 and devices 140, 150, and 160. In general, the one or more networks 110 may include and implement any commonly defined network architectures including those defined by standards bodies, such as the Global System for Mobile communication (GSM) Association, the Internet Engineering Task Force (IETF), and the Worldwide Interoperability for Microwave Access (WiMAX) forum. For example, the one or more networks may implement one or more of a GSM architecture, a General Packet Radio Service (GPRS) architecture, a Universal Mobile Telecommunications System (UMTS) architecture, and an evolution of UMTS referred to as Long Term Evolution (LTE). The one or more networks may implement a WiMAX architecture defined by the WiMAX forum or a Wireless Fidelity (WiFi) architecture. The one or more networks may include, for instance, a local area network (LAN), a wide area network (WAN), the Internet, a virtual LAN (VLAN), an enterprise LAN, a layer 3 virtual private network (VPN), an enterprise IP network, or any combination thereof.

In some implementations, the one or more network(s) 110 may include a cloud system, one or more storage systems, and the one or more servers described above. The one or more network(s) 110 including the cloud system may provide Internet connectivity and other network-related functions. The cloud system may provide one or more features of the anonymous information sharing service.

The one or more network(s) 110 may include one or more databases, access points, servers, storage systems, cloud systems, access points, and modules. For instance, the one or more network(s) 110 may include one or more server(s) 120, which may include any suitable computing device coupled to the one or more network(s) 110, including but not limited to a personal computer, a server computer, a series of server computers, a mini computer, and a mainframe computer, or combinations thereof.

The one or more server(s) 120 may implement one or more operations of the anonymous information sharing service, as described herein, but are not necessarily limited thereto. For example, the one or more server(s) 120 may include a web server (or a series of servers) running a network operating system, examples of which may include but are not limited to Microsoft® Windows® Server, Novell® NetWare®, or Linux®. The one or more server(s) 120 may also implement common and standard protocols and libraries, such as the Secure Sockets Layer (SSL) protected file transfer protocol, the Secure Shell File Transfer Protocol (SFTP)-based key management, and the NaCl encryption library. The one or more server(s) 120 may be used for and/or provide cloud and/or network computing. Although not shown in the figures, the one or more server(s) 120 may have connections to external systems providing messaging functionality such as e-mail, SMS messaging, text messaging, and other functionalities, such as encryption/decryption services, cyber alerts, etc.

The one or more server(s) 120 may be connected to or may be integrated with a database. The database may be a cloud database or a database managed by a database management system (DBMS). In general, a cloud database may operate on platforms such as Python. A DBMS may be implemented as an engine that controls organization, storage, management, and retrieval of data in a database. DBMSs frequently provide the ability to query, backup and replicate, enforce rules, provide security, do computation, perform change and access logging, and automate optimization. Examples of DBMSs include Oracle® database, IBM® DB2, Adaptive Server Enterprise, FileMaker®, Microsoft® Access®, Microsoft® Structured Query Language (SQL) Server, MySQL™, PostgreSQL®, MongoDB, Mondo/ES JavaScript Object Notification (JSON), and a NoSQL implementation. A DBMS typically includes a modeling language, data structure, database query language, and transaction mechanism. The modeling language may be used to define the schema of each database in the DBMS, according to the database model, which may include a hierarchical model, network model, relational model, object model, or some other applicable known or convenient organization. Data structures can include fields, records, files, objects, and any other applicable known or convenient structures for storing data. A DBMS may also include metadata about the data that is stored.

The one or more network(s) 110 may also include one or more access point(s) 130. The access point(s) 130 may provide one or more connections between the one or more server(s) 120 and the devices 140, 150, or 160, and between the one or more server(s) 120 and any external system or device. The access point(s) 130 may control incoming and outgoing network data according to rules set by a network or access point administrator. The access point(s) 130 may be any combination of hardware and/or software, and may include firewalls, routers, and/or gateways. The access point(s) 130 may include address mapping tables, transceivers, mux, demux, codecs, amplifiers, and one or more storage units.

Each of the devices 140, 150, and 160 may be any suitable electronic device, mobile and immobile, that is utilized by a user to access the anonymous information sharing service. Examples of the device 140, 150, and 160 include, but are not limited to, a computer, lap top, desktop, personal digital assistant, electronic pad, electronic notebook, mobile phone (e.g., smart phone), smart television, smart watch, smart glasses, network appliance, camera, enhanced general packet radio service (EGPRS) mobile phone, media player, navigation device, email device, and game console. In general, each of devices 140, 150, and 160 may be any electronic device that is connected to a network and has an input unit and an output unit, such as a display. Devices 140, 150, and 150 may be connected to the one or more network(s) 110 through the same access point 130 or different access points 130. In some implementations, devices 140, 150, or 150 may be connected to the one or more server(s) 120 in the one or more network(s) 110 through a proxy server.

Devices 140, 150, and 160 may receive input data such as data to be provided in an incident report, data to include in a user template, and data to access and browse the Internet. Devices 140, 150, and 160 may transmit the input data to the one or more server(s) 120 through one or more network(s) 110 to the one or more server(s) 120. Devices 140, 150, and 160 may also receive, from the one or more servers(s) 120, reports and data associated with one or more incidents. The reports and data may include various types of information including information on cyber-attacks, trends of cyber-attacks, and remediation guidance for the cyber-attacks.

Figure 2:
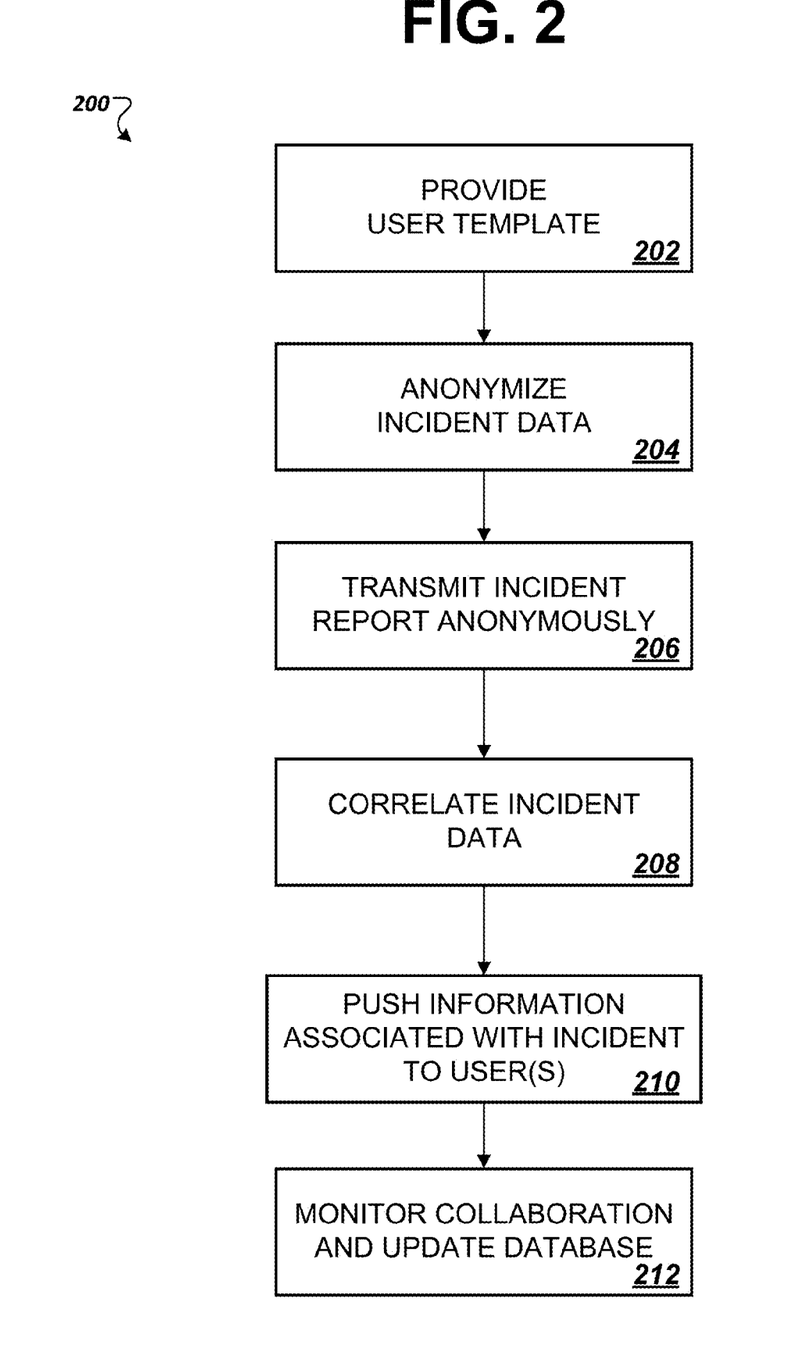
FIG. 2 is a flowchart of an exemplary method for the anonymous information sharing service.

FIG. 2 is a flowchart of an exemplary method of the anonymous information sharing service. When a user joins the anonymous information sharing service, a user template may be provided to the user (202). The user template may be provided through various suitable means, such as, for example, an application downloaded onto the user's device. In some implementations, upon joining the anonymous information sharing service, a software or module may be installed on the device 140, 150, or 160 of the user to facilitate the anonymous information sharing service. This software or module may be configured to execute one or more functions to implement the anonymous information sharing service.

The user may input information such as company name, facility names, alias names of the company or facilities, Internet Protocol address ranges, telephone number ranges, product names and aliases, personnel names, email domains, and any other terms or information the user would like to incorporate into the user template and anonymize in any submitted incident reports. The user template may be stored in device 140, 150, or 160, and is not transmitted over the one or more network(s) 110 so that only the user is in possession of the user template and any data the user would like to anonymize.

Next, whenever the user logs in to access the anonymous information sharing service to report incident data, the user may be authenticated in an anonymous manner and the incident data to be reported may be anonymized using a user template of the user who is logged in (204). Anonymous authentication of the user and the anonymization of incident data is described in further detail with reference to FIGS. 3 and 4.

Figure 3:
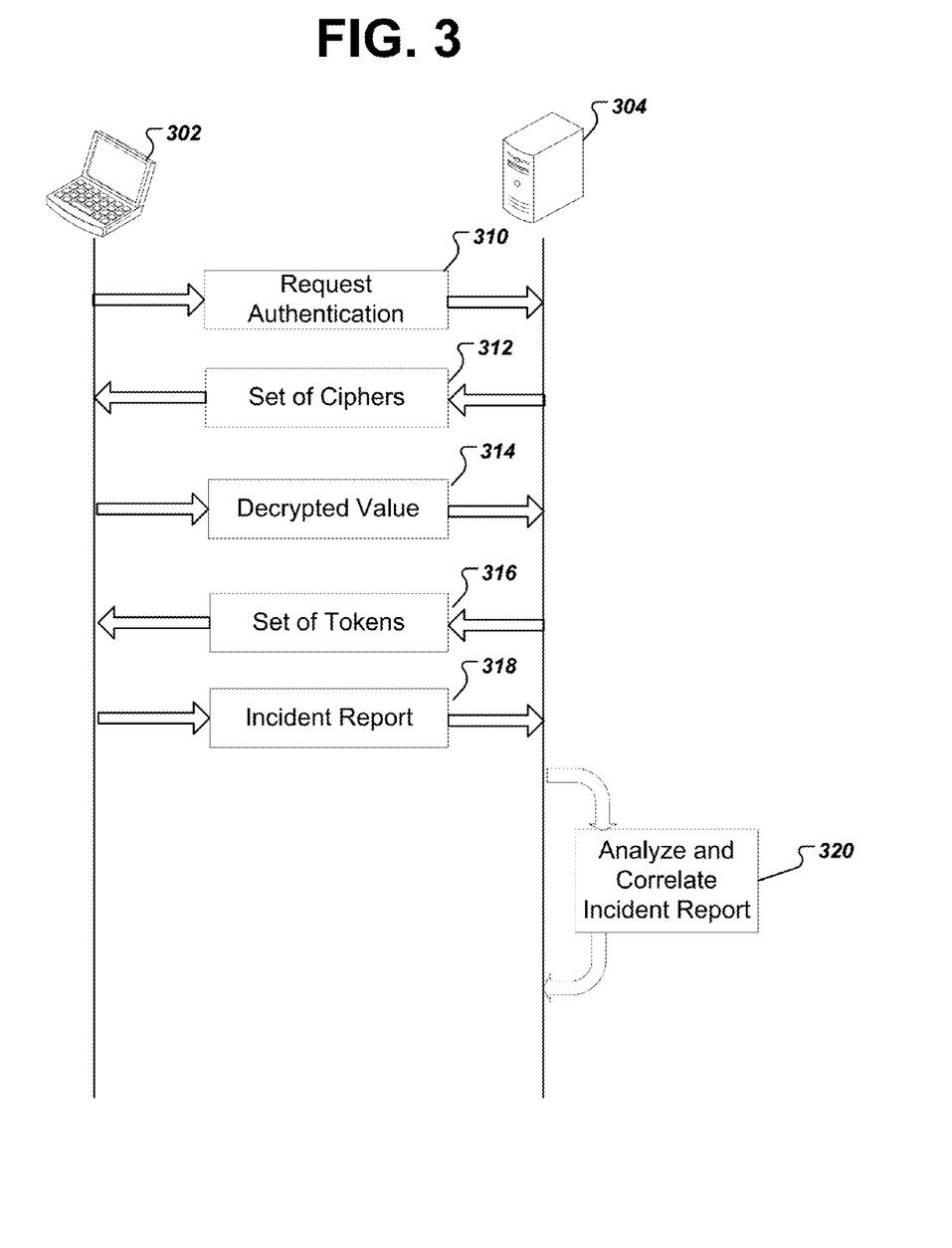
FIG. 3 is an illustration of an exemplary messaging diagram showing an example of anonymous authentication.
Figure 4:
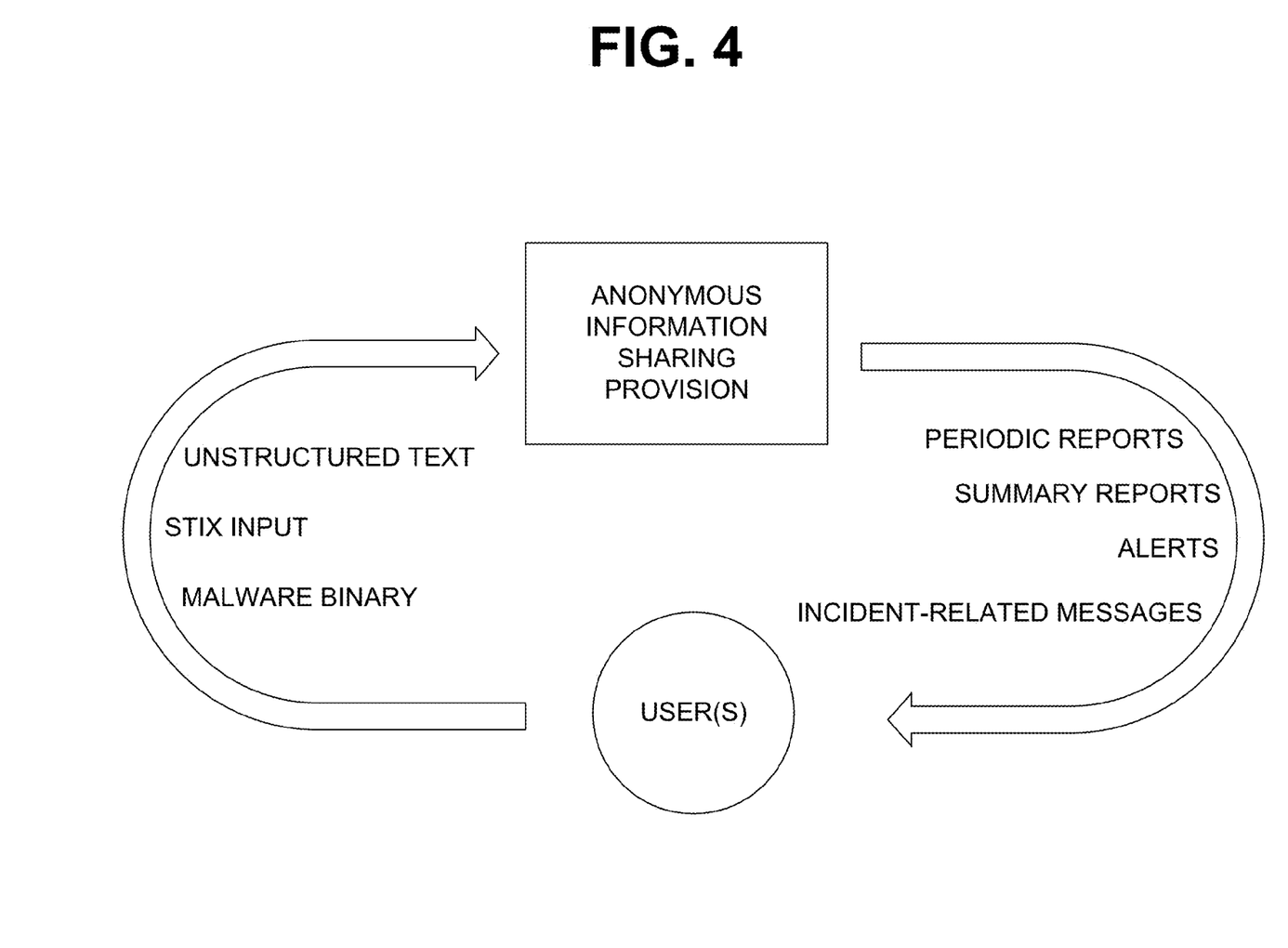
FIG. 4 is an illustration of an exemplary cycle of information sharing in the anonymous information sharing service.

FIG. 3 is an exemplary messaging diagram showing an example of anonymous authentication. In FIG. 3, device 302 corresponds to any of devices 140, 150, or 160, and server 304 corresponds to the one or more server(s) 120. The messages transmitted between device 302 and server 304 in FIG. 3 may be sent using any suitable protocol, such as HTTPS over TCP/IP. In some implementations, device 302 may transmit the messages to server 304 using an IP anonymization network (e.g., Tor). The encryption and keys described below may be implemented using any suitable hardware or software library, such as, for example, the sodium port of the NaCl encryption library.

Referring to FIG. 3, a user j associated with device 302 may access server 304 and request authentication (310). "j" may be any whole number greater than 1. The anonymous information sharing service may include n users, labeled 0, . . . , n−1. In some implementations, the authentication request may be automatically sent to server 304 when a user logs in. It should be understood that device 302 may, in some cases, be connected to server 304 without any intermediary servers, and, in some cases, be connected to server 304 through a proxy server to obscure an IP address of the device 302 during data transmissions.

The server 304 may select a random value w and random coins $r_0, \ldots, r_{n-1}$. Random coins may be helpful to prevent chosen ciphertext attacks. The server 304 may then encrypt w with each user's public key generating $c_i = E_i(w|r_i)$ for each i in $\{0, \ldots, n-1\}$. The server 304 may send all the ciphers $c_i$ to device 302 (312).

Device 302 associated with user j selects $c_j$ and decrypts $c_j$ with device 302's secret key, giving the value $D_j(c_j) = w|r_j$. Device 302 may then transmit the decrypted value, w, to the server 304 (314). The server 304 may compare the decrypted value for w received from device 302 with the value of w originally chosen by the server 304. If the two values of w match, the user is authenticated. If the two values of w do not match, the server 304 may break a connection with the device 302.

To ensure that the server 304 did not break anonymity, the server 304 sends tokens $r_0, \ldots, r_{n-1}$ to the device 302 (316). The device 302 may compute $E_i(w|r_i)$ using each other user's public key. For example, device 302 may retrieve public keys for all or a subset of the other authorized users of the anonymous information sharing service from a repository hosted by the anonymous information sharing service or a third-party.

Device 302 may then compare the computed $E_i(w|r_i)$ to the original $c_i$ sent by the server 304. If the computed value and server-sent value of $c_i$ match, the user can be assured that server 304 sent the same w under each encryption, proving anonymity. If the computed value and the server-sent value of $c_i$ do not match, the user may conclude that the server 304 acted impermissibly and may break the connection with server 304. This comparison ensures that the server 304 does not send different values of w.

If user j associated with device 302 does not break device 302's connection with the server 304, then the user j may input incident data to generate and submit an incident report (318). Incident data may include, but is not limited to, information indicating one or more of a type of cyber-attack to be reported, date(s) and time(s) of the attack, trends of the attack, solutions or preventive measures for the attack, intelligence on the attack actors, intended targets of the attack, and any additional details associated with the attack.

Device 302 may provide an interface (e.g., graphical interface displayed locally on device 302) that allows user j to input the incident data and to expeditiously remove attributable data using user j's template. In some implementations, the interface may be provided by the software installed in device 302 upon user j joining the anonymous information sharing service.

The incident data may be input in various suitable manners and in various suitable formats. For example, in some implementations, the incident data may be input according to any suitable machine-readable format such as, for example, the Structured Threat Information eXpression (STIX) format. In some implementations, the incident data may be provided or processed according to Security Information and Event Management (SIEM) capabilities. In some implementations, the incident data may be input using unstructured text. In some implementations, user j may also attach one or more files, such as a malware binary, to be submitted with the incident report.

Upon receipt of incident data from user j, device 302 may excise all attributable terms from the incident data using the information in user j's template. For example, user j's template may include information such as a company name, facility names, alias names of the company or facilities, intellectual property information, personally identifiable information (PII), Internet Protocol address ranges, telephone number ranges, product names and aliases, personnel names, email domains, and any other terms or information user j would like to anonymize in a submitted incident report. The attributable terms may be excised from the incident data using encryption, which allows the anonymous information sharing service to correlate between incident reports over time without identifying an attributable data item. As an example, the anonymous information sharing service may determine that the same server is being attacked repeatedly over time without actually identifying the server.

An encryption key using, for example a SALSA20 cipher, may be utilized for encryption of the excised attributable terms. In general, any suitable encryption key may be used for encryption of the excised attributable terms. Knowledge of the encryption key may remain with user j, and is not shared with server 304. Accordingly, if user j would like to decrypt attributable terms from a submitted incident report, user j can decrypt the attributable terms using the encryption key of which only user j has knowledge. Server 304 has no knowledge of the encryption key.

In some implementations, the attributable terms may be redacted or entirely removed using any suitable means. In some implementations, the input incident data may be further processed using different tools, such as, for example, a spell check tool, to improve the accuracy and disclosure of the input incident data. In some implementations, attributable terms may be removed using a word finder, a word-association tool, and remover tool.

After the incident data is anonymized to remove or encrypt attributable terms, an incident report may be generated using the anonymized incident data, and presented to user j associated with device 302, so that user j may visually review the generated incident report. In some cases, upon review, user j may choose to further amend the generated incident report for general editing purposes or to remove and/or encrypt any additional data the user would not like to be included in the incident report. In some cases, upon review, user j may be satisfied with the generated incident report and/or opt to transmit the incident report to server 304 (206, 318).

Device 302 may transmit the incident report to server 304 upon receiving a selection to transmit the incident report through the interface provided to user j by device 302 (206, 318). The selection may be made by user j selecting (e.g., clicking, touching) a transmit/send option (e.g., icon, text, graphical representation).

The incident report, including any attached files (e.g., malware binary), may be transmitted to server 304 in a secure and anonymous manner. For example, in some implementations, the incident report may be transmitted over a SSL channel. In some implementations, the incident report may be transmitted through a proxy server to obscure device 302's source IP address. In some implementations, an anonymous authentication process, as described hereinabove, may be performed again prior to transmitting the incident report.

Performing anonymous authentication and anonymization of incident data as described hereinabove offers several advantages. For example, no attributable data is ever sent to server 304 during an incident report submission. Private encryption keys for encrypting attributable data are generated and maintained by a user and are not stored or received by server 304. User review prior to submission ensures completeness of data anonymization to the satisfaction of a user and user control of the incident report content. The disclosed implementations provide security to all users of the anonymous information sharing service since even if a server or database is compromised, user information cannot be obtained. A user's identity cannot be compromised even to an internal threat within the one or more networks 110.

Once the device 302 has anonymously submitted an incident report to server 304, the incident report may be correlated and analyzed to provide actionable intelligence to the submitting user and/or other users of the anonymous information sharing service (208, 320). For instance, the server 304 may correlate an attack reported in the incident report with open source information to derive further information about the attack. In some implementations, the anonymized incident report may be correlated with one or more other anonymized incident reports.

Information derived from the incident report and related open source information may be utilized to determine information associated with the attack reported in the incident report. For instance, server 304 may determine a security measure that can be used to prevent the attack from occurring, or may provide one or solutions for restoring a computer or system after the computer or system has been affected by the attack. In general, the server 304 may generate one or more of: warnings for the attack; remediation guidance, directions on how to reduce risk; information indicating likely targets and/or trends of the attack; indicators of compromise, entry points and technologies associated with the attack; methods utilized by the attack; and any other information that can be derived from the incident report and related open source information. Indicators of compromise may include information indicating that cybersecurity of one or more particular systems, computers, or networks has been compromised.

In some implementations, the information derived from the incident report, related open source information, and information generated by the server 304 may be further verified through various resources, such as, for example, open source channels, experts in cyber-attacks, administrators of the anonymous information sharing service, publicly available information, and members of cyber security communities.

Server 120/304 may then push the generated and derived information associated with the incident, as described above, to user j and other users of the anonymous information sharing service in various manners, such as through a cloud-based platform and/or a web-based interface (210).

In some implementations, the server 120/304 may immediately transmit a message (e.g., alert) to all users of the anonymous information sharing service after receiving an incident report from a user (e.g., user j). The message may include information associated with the received incident report.

In some implementations, an initial message (e.g., alert) may be first transmitted to all authorized users, and a secondary message is transmitted shortly after the initial message. The initial message may alert all authorized users of a reported attack including some basic information about the reported attack. The secondary message may include the generated and derived information associated with the reported attack, and, in general, may provide any additional information about the reported attack.

In some implementations, the server 120/304 may send one or more messages including the generated and derived information associated with an incident to only a select group of authorized users after receiving an incident report reporting the incident. The select group of authorized users may be selected based on one or more of the following factors associated with each respective user: geographical location, business type, business interests, and computer or server systems utilized. In some cases, information that was not anonymized by a user when the user joins the anonymous information sharing service (e.g., information not anonymized in the user template) may be utilized to select users. In general, any suitable factor may be used to select authorized users for receiving the one or more messages. In some cases, users may select one or more filters to filter, using metadata in the message, the types of alerts and reports the users want to receive or prioritize.

The messages transmitted from the server 120/304 to users of the anonymous information sharing service may be sent in various manners. For example, the messages may be transmitted using text messages, emails, portal notifications, and/or SMS messaging.

In some implementations, server 120/304 may also provide summary reports focusing on information that is customized for a user receiving the summary report. For instance, the summary report may include data indicating a degree of risk the user receiving the message may be at with respect to the incident being reported. In general, the summary report may providing any information that may be determined by the anonymous information sharing service to be relevant to the user receiving the summary report.

In some implementations, server 120/304 may transmit periodic (e.g., semi-annually, quarterly, monthly, weekly, daily) reports that provide information on attack trends and any other information associated with cyber security. The periodic reports may highlight one or more reported attacks and provide detailed information associated with the one or more reported attacks so that users of the anonymous information sharing service may be informed of attacks on a periodic basis even if the users were not affected by attacks during a particular period. The periodic reports may be sent to all users of the anonymous information sharing service, to a select group of users selected based on factors noted above, or a group of users that have subscribed to receive the periodic reports.

In some cases, the messages from server 120/304 may include, for example, a browser link to access any incident-related information or report. In some cases, the messages may include a notification that users may access the incident-related information or report through their secure platform accounts in the anonymous information sharing service.

Referring back to FIG. 2, after pushing generated and derived information associated with an incident to one or more users, the anonymous information sharing service may be monitored by server 120/304 for search and collaborative activities related to an incident. For example, users may collaborate to discuss one or more issues (e.g., remediation, preventive measures, experiences, solutions, details or other data) associated with an incident.

In some cases, users may ask questions or submit inquiries related to an incident to other users of the anonymous information sharing service.

In some cases, a user of the anonymous information sharing service may search a database of the anonymous information sharing service for a particular incident the user is interested in. The database of the anonymous information sharing service may be continuously updated by server 120/304 in a real-time manner to reflect any new data or information associated with an incident. The database may also be updated to include collaboration or discussions between users regarding an incident. Thus, when a user of the anonymous information sharing service searches the database of the anonymous information sharing service for a particular incident, the user may be provided with up-to-date information, including any collaborations and discussions of users, associated with the particular incident.

Users may also be provided with open-source feeds and analytical tools associated with an incident by the anonymous information sharing service. The open-source feeds and analytical tools may further increase a user's knowledge or understanding of an incident. The analytical tools may include, for example, various types of filters such as: filters configured to identify threats to a particular business type, geographical region, sector, or technology type; filters configured to identify trends for a particular incident; and filters configured to identify incidents occurring in a particular time period of interest to the user. In some implementations, the user may also be provided with a graphical user interface to select which open-source feed and/or analytical tool the user would like to use.

Accordingly, as described above and illustrated in FIG. 4, an anonymous information sharing service is described through which users of the anonymous information sharing service may anonymously provide input data, such as incident data, through various manners (e.g., unstructured text, STIX input, attached files), and benefit from receiving anonymous information (e.g., anonymized reports from other users, periodic and summary trend reports, relevant open source information, alerts, incident-related messages) in a real-time manner indicating issues of interest (e.g., cyber security, cyber-attacks, remediation, etc.) to all users of the anonymous information sharing service. The anonymous information sharing service also provides users with a platform to collaborate, search for, discuss, and share information.

The anonymous information sharing service thus enables each user to benefit from: the collective experience, knowledge, and technical expertise of a community of users; receiving up-to-date intelligence on cyber security-related issues; a trend of cyber-attacks and a predictive view of attacks likely to harm a user; and more accurately assessing the user's security posture, cyber defense, management and budget of cyber security, and allocation of resources. Additionally, users benefit from sharing cyber incident information through a secure platform that protects their identity. Users also have the assurance of knowing that all report information comes from other anonymously verified users of the anonymous information sharing service.

Figure 5:
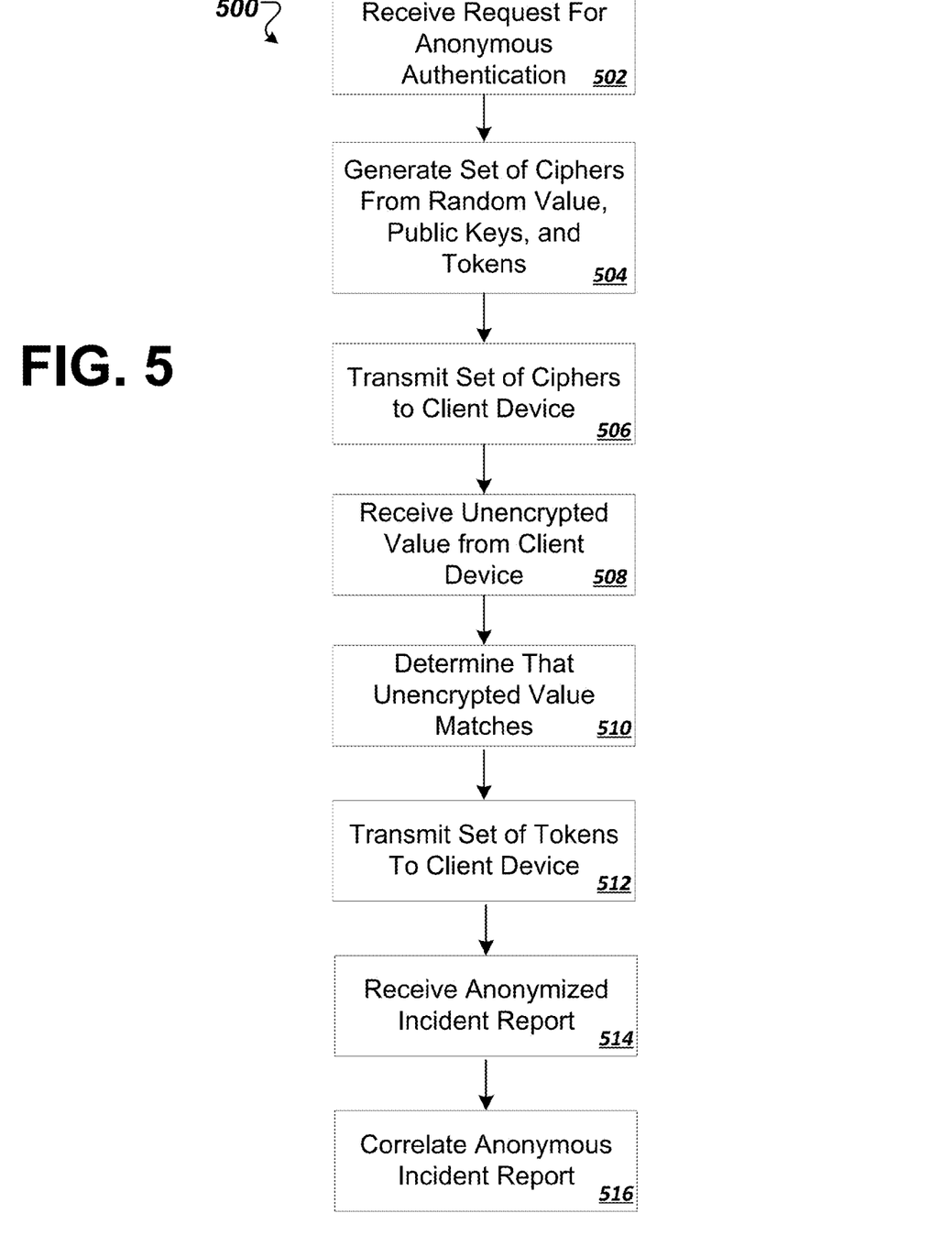
FIG. 5 is a flow chart of an exemplary transaction of a user with the anonymous information sharing service.

FIG. 5 is a flow chart of an example transaction 500 of a user with the anonymous information sharing service. A server (e.g., server 120/304) receives a request for anonymous authentication (502) from a client device (e.g., device 140, 150, or 160). The server then generates a set of ciphers, wherein each cipher is based on a selected random value encrypted with one of a set of random tokens and one of a set of public keys of users of the anonymous information sharing service (504). The server transmits the set of ciphers to the client device (506). Then, the server receives, from the client device, an unencrypted value based on the set of ciphers (508). The server determines that the unencrypted value received from the client device matches the selected random value (510). Subsequently, the server transmits, to the client device, the set of random tokens so that the client device can determine that the server did not identify the authorized user (512). For example, the client device may compare the tokens to the original ciphers sent by the server to ensure that the server didn't send different values. If the tokens match, the user can be assured that server sent the same random value under each encryption, proving anonymity.

The server then receives, from the client device, an anonymized incident report (514). The server correlates the anonymized incident report with open source information and one or more other anonymized incident reports stored in a storage device (e.g., a database) to provide anonymized reports and relevant other anonymized reports and open source information to other users of the anonymous information sharing service (516).

Figure 6:
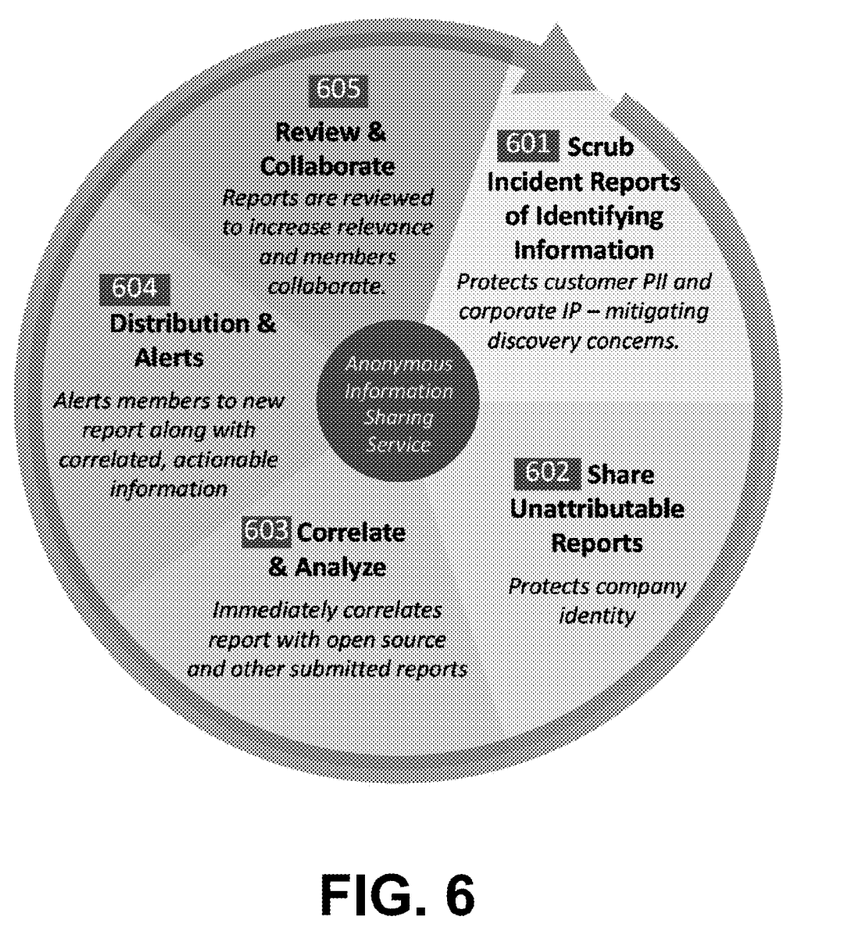
FIG. 6 is a flowchart of an exemplary method for the anonymous information sharing service.

FIG. 6 illustrates a process flow for the anonymous information sharing service according to an exemplary scenario when a user would like to report a cyber-attack, a threat of a cyber-attack, a trend of a cyber-attack, or remediation guidance for a cyber-attack.

After logging into the anonymous information sharing service and being authenticated, a user may enter incident data to generate an incident report. A template stored in the user's device may be utilized to scrub the incident report (601). For example, an application running on the user's device obtains a template, which indicates data to be anonymized. The application analyzes incident data entered by the user, and removes or redacts any data corresponding to information the user has indicated in the template to be anonymized. This anonymization of data protects information (e.g., a user's personal identification information (PII) or IP address) that can be used to identify a user.

After anonymizing the data, an incident report is generated and transmitted to a server in a manner that a source of the incident report is unknown, as described above. Accordingly, the incident report may be shared without attributing any user to the incident report (602).

The server may correlate and analyze the incident report to provide actionable intelligence to the submitting user and/or other users of the anonymous information sharing service (603). For instance, the server may correlate an attack reported in the incident report with open source information to derive further information about the attack. In some implementations, the anonymized incident report may be correlated with one or more other anonymized incident reports.

The server may store the received incident report and any related analyses (e.g., correlation), and share the incident report and related analyses to other users of the anonymous information sharing service (604). As described above, incident reports and related analyses may be shared according to various criteria including, for example, a receiving user's preference, business interest, or technology. The incident report and related analyses may include threat analysis, reports with remediation guidance, and directions on how to reduce risk. In some implementations, the server may transmit a message (e.g., alert) to all users of the anonymous information sharing service after receiving an incident report from a submitting user. The message may include information associated with the received incident report.

Users of the anonymous information sharing service may be able to provide feedback and reviews on received incident reports and related analyses (605). In some implementations, the feedback and reviews may be received at the server in an anonymous manner. In some implementations, identities of users providing the feedback and reviews may be known. In some implementations, the anonymous information sharing service may include member forums that provide an opportunity for users to discuss trends and specific issues, and define future strategies.

Certain implementations of the anonymous information sharing service have been described hereinabove. It should be understood that these implementations are exemplary and not intended to be limiting in any manner. For example, although the anonymous authentication process has been described as occurring after a user logs in and before an incident is reported, anonymous authentication may be performed at any time.

Furthermore, it should be understood that although the anonymous information sharing service has been described with respect to incidents such as cyber-attacks or cyber security, the anonymous information sharing service may be implemented to anonymous share and collaborate on various other types of information for which user privacy or user anonymity is important. For instance, the anonymous information sharing service may be utilized for sharing information on various matters (e.g., crime control, drug enforcement matters, military intelligence), or in any virtual forum in which users can anonymously contribute in a verified manner.

Implementations and operations described in this disclosure can be executed in digital electronic circuitry, or in computer software, firmware, or hardware, including the structures disclosed in this disclosure and their structural equivalents, or in combinations of one or more of them. Implementations and operations described in this disclosure can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this disclosure can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations and operations described in this disclosure can be executed on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations and operations described in this disclosure can be executed in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this disclosure, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this disclosure contains many specific implementation details, these should not be construed as limitations on the scope of any inventions or of what may be claimed, but rather as descriptions of features specific to particular implementations. Certain features that are described in this disclosure in the context of separate implementations and operations can also be executed in combination. Conversely, various features that are described in the context of a single implementation can also be realized in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all embodiments, and it should be understood that the described program components and systems can generally be integrated together in a single software product or packaged into multiple software products.

Thus, particular implementations and operations have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
  receiving, at a server from a client device, a request for anonymous authentication, the client device being operated by an authorized user of an information sharing service;
  generating, at the server, a set of ciphers, wherein each cipher is based on a selected random value and a particular random token selected from a set of random tokens that are encrypted with a particular public key selected from a set of public keys associated with users of the information sharing service, wherein the set of ciphers corresponds to the set of random tokens and the set of public keys;
  transmitting, to the client device, the set of ciphers;
  receiving, from the client device, a decrypted value based on the set of ciphers;
  determining, at the server, that the decrypted value matches the selected random value;
  transmitting, to the client device, the set of random tokens such that the client device can determine that the server did not identify the authorized user;
  receiving, from the client device, an anonymized incident report; and
  correlating the anonymized incident report with open source information and one or more of another anonymized incident report to provide one or more reports to users of the information sharing service.

2. The computer-implemented method of claim 1, further comprising:
  providing, to the client device, a template, and wherein the received anonymized incident report is anonymized using the template.

3. The computer-implemented method of claim 2, wherein:
   user attributable terms in the incident report are detected using the template; and
   the detected user attributable terms are encrypted.

4. The computer-implemented method of claim 1, further comprising:
   detecting collaboration between users of the information sharing service after providing the one or more reports; and
   updating a database of the information sharing service with the collaboration.

5. The computer-implemented method of claim 1, wherein the anonymized incident report includes information associated with one or more of a type of cyber-attack, a date and time of the cyber-attack, a location or sector where the cyber-attack occurred, a solution or preventive measure for the cyber-attack, indicators of compromise, intelligence on an actor of the cyber-attack, and a target of the cyber-attack.

6. The computer-implemented method of claim 1, further comprising:
   breaking a connection with the client device in response to the decrypted value not matching the selected random value.

7. The computer-implemented method of claim 1, wherein providing one or more reports to users of the information sharing service comprises:
   generating, by the server and based on the correlating, cyber-attack information indicating one or more of: warnings for a cyber-attack reported in the anonymized incident report, remediation guidance for the cyber-attack, directions on how to reduce user risk to the cyber-attack, information indicating likely targets or trends of the cyber-attack, entry points and technologies associated with the cyber-attack, and methods utilized by the cyber-attack; and
   transmitting, based on preferences of the users of the information sharing service, a first message including the cyber-attack information.

8. A non-transitory computer-readable storage medium comprising instructions, which when executed by one or more computers which, cause the one or more computers to perform actions comprising:
   receiving, from a client device, a request for anonymous authentication, the client device being operated by an authorized user of an information sharing service;
   generating, a set of ciphers, wherein each cipher is based on a selected random value and a particular random token selected from a set of random tokens that are encrypted with a particular public key selected from a set of public keys associated with users of the information sharing service, wherein the set of ciphers corresponds to the set of random tokens and the set of public keys;
   transmitting, to the client device, the set of ciphers;
   receiving, from the client device, a decrypted value based on the set of ciphers;
   determining that the decrypted value matches the selected random value;
   transmitting, to the client device, the set of random tokens such that the client device can determine that the server did not identify the authorized user;
   receiving, from the client device, an anonymized incident report; and
   correlating the anonymized incident report with open source information and one or more of another anonymized incident report to provide one or more reports to users of the information sharing service.

9. The non-transitory computer-readable storage medium of claim 8, further comprising:
   providing, to the client device, a template, and
   wherein the received anonymized incident report is anonymized using the template.

10. The non-transitory computer-readable storage medium of claim 9, wherein:
    user attributable terms in the incident report are detected using the template; and
    the detected user attributable terms are encrypted.

11. The non-transitory computer-readable storage medium of claim 8, further comprising:
    detecting collaboration between users of the information sharing service after providing the one or more reports; and
    updating a database of the information sharing service with the collaboration.

12. The non-transitory computer-readable storage medium of claim 8, wherein the anonymized incident report includes information associated with one or more of a type of cyber-attack, a date and time of the cyber-attack, a location or sector where the cyber-attack occurred, a solution or preventive measure for the cyber-attack, indicators of compromise, intelligence on an actor of the cyber-attack, and a target of the cyber-attack.

13. The non-transitory computer-readable storage medium of claim 8, further comprising:
    breaking a connection with the client device in response to the decrypted value not matching the selected random value.

14. The non-transitory computer-readable storage medium of claim 8, wherein providing one or more reports to users of the information sharing service comprises:
    generating, based on the correlating, cyber-attack information indicating one or more of: warnings for a cyber-attack reported in the anonymized incident report, remediation guidance for the cyber-attack, directions on how to reduce user risk to the cyber-attack, information indicating likely targets or trends of the cyber-attack, entry points and technologies associated with the cyber-attack, and methods utilized by the cyber-attack; and
    transmitting, based on preferences of the users of the information sharing service, a first message including the cyber-attack information.

15. A system comprising:
    one or more computers and one or more storage devices storing instructions that are operable and when executed by the one or more computers, cause the one or more computers to perform actions comprising:
    receiving, from a client device, a request for anonymous authentication, the client device being operated by an authorized user of an information sharing service;
    generating, a set of ciphers, wherein each cipher is based on a selected random value and a particular random token selected from a set of random tokens that are encrypted with a particular public key selected from a set of public keys associated with users of the information sharing service, wherein the set of ciphers corresponds to the set of random tokens and the set of public keys;
    transmitting, to the client device, the set of ciphers;
    receiving, from the client device, a decrypted value based on the set of ciphers;
    determining that the decrypted value matches the selected random value;

transmitting, to the client device, the set of random tokens such that the client device can determine that the server did not identify the authorized user;

receiving, from the client device, an anonymized incident report; and correlating the anonymized incident report with open source information and one or more of another anonymized incident report to provide one or more reports to users of the information sharing service.

16. The system of claim 15, further comprising:

providing, to the client device, a template;

detecting collaboration between users of the information sharing service after providing the one or more reports; and updating a database of the information sharing service with the collaboration.

17. The system of claim 16, wherein:

the received anonymized incident report is anonymized using the template;

user attributable terms in the incident report are detected using the template; and the detected user attributable terms are encrypted.

18. The system of claim 15, wherein the anonymized incident report includes information associated with one or more of a type of cyber-attack, a date and time of the cyber-attack, a location or sector where the cyber-attack occurred, a solution or preventive measure for the cyber-attack, indicators of compromise, intelligence on an actor of the cyber-attack, and a target of the cyber-attack.

19. The system of claim 15, wherein providing one or more reports to users of the information sharing service comprises:

generating, based on the correlating, cyber-attack information indicating one or more of: warnings for a cyber-attack reported in the anonymized incident report, remediation guidance for the cyber-attack, directions on how to reduce user risk to the cyber-attack, information indicating likely targets or trends of the cyber-attack, entry points and technologies associated with the cyber-attack, and methods utilized by the cyber-attack; and transmitting, based on preferences of the users of the information sharing service, a first message including the cyber-attack information.

20. The system of claim 19, wherein transmitting, based on preferences of the users of the information sharing service, a first message including the cyber-attack information comprises transmitting the first message using one or more of electronic mail and short message service (SMS) messaging, and wherein the preferences of the users of the information sharing service include, for each respective user, indications of a type of content and message to be received.

* * * * *